(12) United States Patent
Kuroiwa et al.

(10) Patent No.: US 12,005,990 B2
(45) Date of Patent: Jun. 11, 2024

(54) HYDRAULIC SHOCK ABSORBER AND SADDLE-TYPE VEHICLE

(71) Applicant: HITACHI ASTEMO, LTD., Hitachinaka (JP)

(72) Inventors: Naoya Kuroiwa, Hitachinaka (JP); Yosuke Murakami, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 495 days.

(21) Appl. No.: 17/240,479

(22) Filed: Apr. 26, 2021

(65) Prior Publication Data

US 2021/0245832 A1  Aug. 12, 2021

Related U.S. Application Data (63) Continuation of application No. PCT/JP2019/001420, filed on Jan. 18, 2019.

(30) Foreign Application Priority Data

Dec. 20, 2018 (JP) ................................ 2018-238690

(51) Int. Cl.
*B62K 25/08* (2006.01)
*B62K 25/04* (2006.01)
(Continued)

(52) U.S. Cl.
CPC .............. *B62K 25/08* (2013.01); *F16F 9/182* (2013.01); *F16F 9/185* (2013.01); *F16F 9/464* (2013.01); *B62K 2025/044* (2013.01); *F16F 13/007* (2013.01); *F16F 2222/12* (2013.01); *F16F 2228/066* (2013.01); *F16F 2230/18* (2013.01);
(Continued)

(58) Field of Classification Search
CPC ... B62K 25/08; B62K 2025/044; F16F 9/464; F16F 9/182; F16F 9/185; F16F 2232/08; F16F 2234/02; F16F 2228/066; F16F 2222/12
See application file for complete search history.

(56) References Cited

U.S. PATENT DOCUMENTS 9,849,934 B2 * 12/2017 Miwa ...................... F16F 9/465
2010/0148412 A1 * 6/2010 Murakami ................ F16F 9/44
267/118

(Continued)

FOREIGN PATENT DOCUMENTS

EP   1826453   *   8/2007
JP   05-006427 Y   2/1993
(Continued)

OTHER PUBLICATIONS

Translation of Japanese Patent No. JP 0814304 (family equivalent to cited Japanese Patent No. JP 2904014) obtained from website: https://worldwide.espacenet.com on Sep. 11, 2023.*

(Continued)

*Primary Examiner* — Pamela Rodriguez
(74) *Attorney, Agent, or Firm* — Leason Ellis LLP; Edward J. Ellis; Melvin C. Garner (57) ABSTRACT

A hydraulic shock absorber includes an enclosure member. The enclosure member has an inflow path which guides oil from the outside to the inside. The inflow path is arranged so that an axis of the inflow path deviates from a central axis of a rod.

21 Claims, 7 Drawing Sheets

(51) Int. Cl.
*F16F 9/18* (2006.01)
*F16F 9/46* (2006.01)
*F16F 13/00* (2006.01)

(52) U.S. Cl.
CPC ..... *F16F 2230/186* (2013.01); *F16F 2232/08* (2013.01); *F16F 2234/02* (2013.01)

(56) References Cited

U.S. PATENT DOCUMENTS

2013/0154233 A1  6/2013  Amano et al.
2019/0127016 A1  5/2019  Murakami

FOREIGN PATENT DOCUMENTS

| JP | 08014304 A | | 1/1996 |
| JP | 2904014 B2 | | 6/1999 |
| JP | 2005-076856 A | | 3/2005 |
| JP | 2012-67777 A | | 4/2012 |
| JP | 6188257 B1 | | 8/2017 |
| WO | WO 2010/109697 | * | 9/2010 |

OTHER PUBLICATIONS

International Search Report dated Feb. 26, 2019 for the corresponding PCT International Patent Application No. PCT/JP2019/001420.
Written Opinion dated Feb. 26, 2019 for the corresponding PCT International Patent Application No. PCT/JP2019/001420.
Extended European Search Report dated Sep. 7, 2022 for the corresponding European Patent Application No. 19899983.1 ( 11 pages).

* cited by examiner

↑ VEHICLE BODY SIDE

↓ AXLE SIDE

↑ VEHICLE BODY SIDE

↓ AXLE SIDE

HYDRAULIC SHOCK ABSORBER AND SADDLE-TYPE VEHICLE

CROSS-REFERENCE TO RELATED APPLICATION

This application is a continuation of PCT application No. PCT/JP2019/001420, which was filed on Jan. 18, 2019, the content of which is incorporated herein by reference in its entirety.

FIELD OF THE INVENTION

The present invention relates to a hydraulic shock absorber which buffers a shock from a road surface and a saddle-type vehicle provided with the hydraulic shock absorber.

BACKGROUND OF THE INVENTION

In saddle-type vehicles such as two-wheeled vehicles and three-wheeled vehicles, a hydraulic shock absorber in which a vehicle body side tube and a wheel side tube have a telescopic form is used as a suspension device for suspending a wheel. As a technique related to such a hydraulic shock absorber, for example, Patent Literature 1 discloses a hydraulic shock absorber in which a cylinder is provided on a wheel side tube and a rod for supporting a piston which is in sliding contact with the cylinder is provided on the vehicle body side tube. In such a hydraulic shock absorber, a hollow rod is fixed to the vehicle body side tube and a small hole and a needle valve as a damping force adjusting unit are provided on a vehicle body side of the rod, and further a damping force is adjusted by oil flowing inside the rod toward the vehicle body side passing through the damping force adjusting unit.

Patent Literature 1: Japanese Patent Publication "Japanese Unexamined Patent Publication No. 2012-67777 (published on Apr. 5, 2012)"

However, in the hydraulic shock absorber disclosed in Patent Literature 1, when the oil flowing inside the rod contains impurities, the impurities may enter between the small hole and the needle valve, which may interfere with the adjustment of the damping force.

An object of the invention is to provide a hydraulic shock absorber and a saddle-type vehicle capable of reducing the amount of impurities flowing with oil.

SUMMARY OF THE INVENTION

As a result of diligent examination, the inventor has found that (a) impurities contained in oil can be separated by using centrifugal force by generating a spiral flow of oil (oil vortex) in a hydraulic shock absorber and (b) the amount of impurities flowing with the oil can be reduced by flowing the oil after separating the impurities by using centrifugal force. The inventor has completed the invention based on findings (a) and findings (b). Hereinafter, the invention will be described. In the following description, reference numerals and letters in the accompanying drawings are added in parentheses to facilitate understanding of the invention, whereby the invention is not limited to the illustrated form.

According to a first aspect, there is provided a hydraulic shock absorber (1) which includes a vehicle body side tube (11), an axle side tube (12) which moves with respect to the vehicle body side tube, a hollow rod (16) which is accommodated in the vehicle body side tube and includes a first flow path (22) in which oil flows in an axial direction inside, a damping force adjusting unit (10) which adjusts a damping force by adjusting a flow resistance of the oil, and an enclosure member (42) which is arranged to surround at least a lower end of the rod, where the enclosure member includes an inflow path (43) which guides oil from the outside to the inside and the inflow path is arranged so that an axis (43B) of the inflow path deviates from an axis (C1) of the rod.

According to a second aspect, there is provided a saddle-type vehicle (2) including the hydraulic shock absorber (1) according to the first aspect.

Advantageous Effects of Invention

According to the invention, it is possible to provide a hydraulic shock absorber and a saddle-type vehicle capable of reducing the amount of impurities flowing with oil.

DETAILED DESCRIPTION OF THE INVENTION

First Embodiment

A front fork as an embodiment of the hydraulic shock absorber of the invention will be exemplified and described below. However, a hydraulic shock absorber of the invention may be realized as a rear damper.

Figure 1:
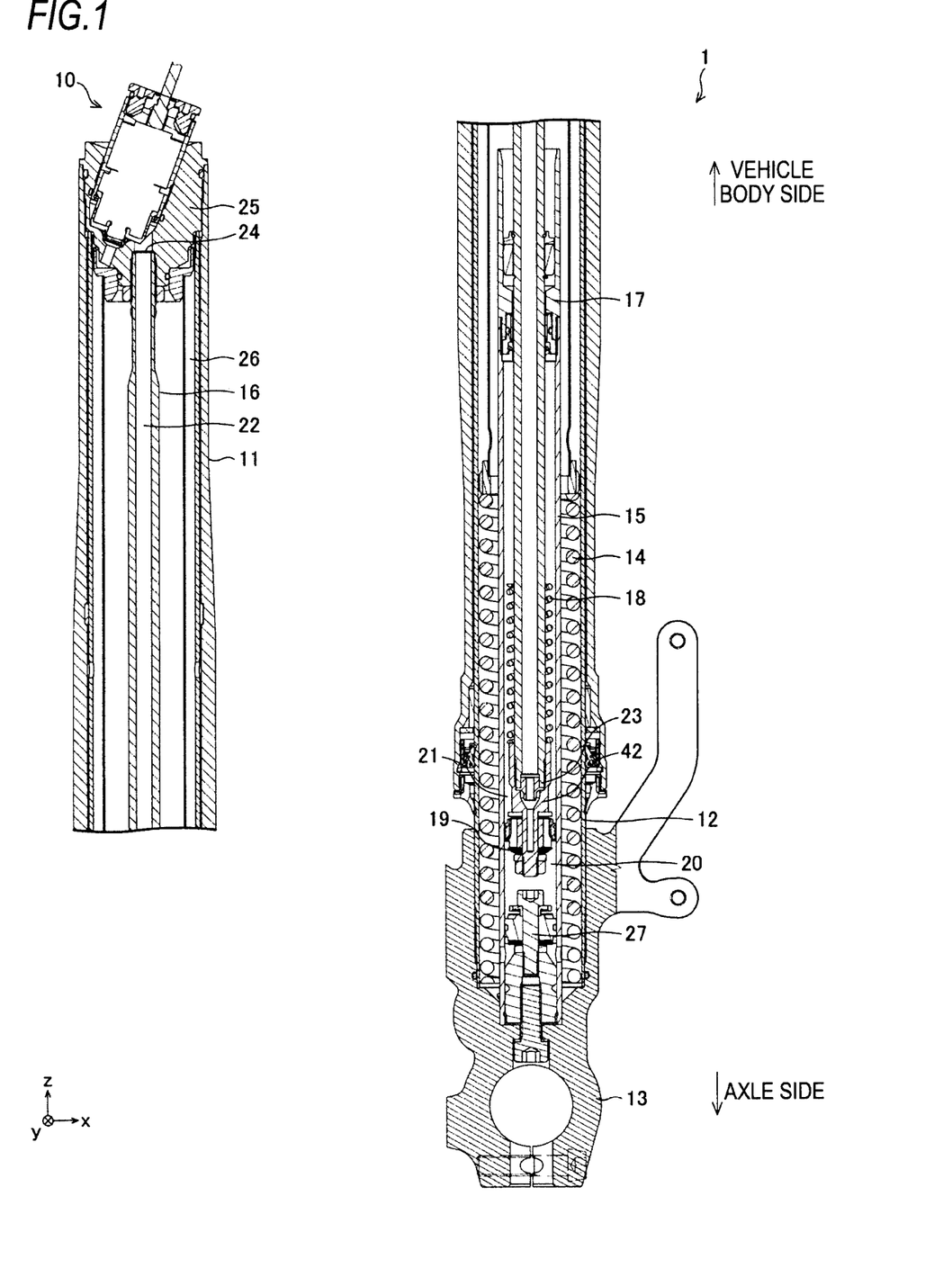
FIG. 1 is a cross-sectional view illustrating a configuration of a hydraulic shock absorber according to an embodiment of the invention.
Figure 2:
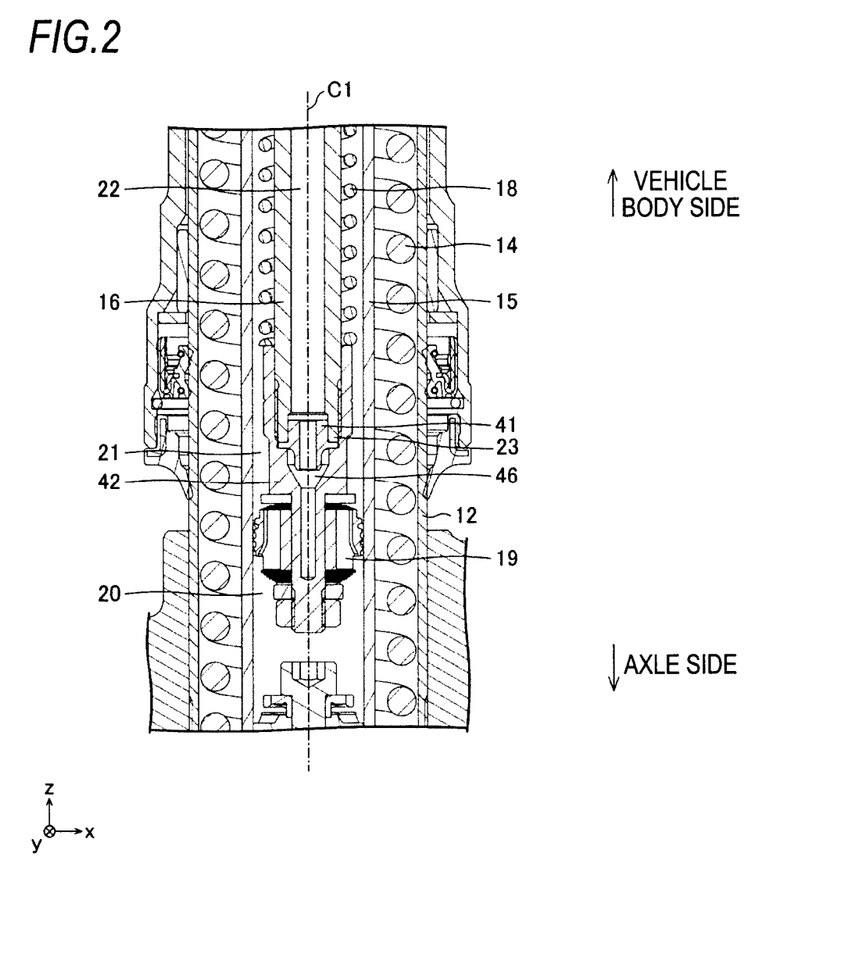
FIG. 2 is a cross-sectional view illustrating a structure in a vicinity of an axle side end of a rod included in the hydraulic shock absorber.

FIG. 1 is a cross-sectional view illustrating a configuration of the hydraulic shock absorber according to the embodiment of the invention. FIG. 2 is a cross-sectional view illustrating a structure in a vicinity of an axle side end of a rod 16 included in a hydraulic shock absorber 1. The hydraulic shock absorber 1 is a device attached to both left and right sides of wheels (not illustrated) in a saddle-type vehicle such as a two-wheeled vehicle or a three-wheeled vehicle and functions as a suspension device for suspending the wheel.

As illustrated in FIGS. 1 and 2, the hydraulic shock absorber 1 is a telescopic type and includes a cylindrical tube 11 (vehicle body side tube) connected to a vehicle body side bracket (not illustrated) and a cylindrical tube 12 (axle side tube) to which the wheel side bracket 13 is connected. The tube 12 moves relative to the tube 11 and moves in and out of the tube 11. Inside the tube 12, a coil spring 14 which urges the tube 11 and the tube 12 in an extension direction is arranged. In the embodiment, the hydraulic shock absorber 1 forms a pair of front forks (see FIG. 11) in combination with the other suspension device (not illustrated) including a coil spring and no built-in damper. In the invention, the hydraulic shock absorber 1 and the other suspension device including a built-in damper may be combined to form a pair of front forks. In the invention, a front fork including the hydraulic shock absorbers 1 as a pair may be configured.

In the hydraulic shock absorber 1, when an impact due to unevenness of the road surface is input to a wheel 4 (see FIG. 10), the tube 12 moves in and out of the tube 11 and expands and contracts. The process in which the hydraulic shock absorber 1 contracts is referred to as a compression process and the process in which the hydraulic shock absorber 1 expands is referred to as an extension process. In the embodiment, the inverted-type hydraulic shock absorber 1 in which the tube 12 goes in and out of the tube 11 will be described, but it is naturally possible to make the hydraulic shock absorber 1 an upright type in which the tube 11 goes in and out of the tube 12.

The hydraulic shock absorber 1 includes a cylinder 15 attached to the axle side of the tube 12 with a central axis C1 (see FIG. 2) as the axis and a rod 16 (hollow rod) accommodated in the tube 11 with the central axis C1 as the axis and attached to the vehicle body side of the tube 11. The extension direction of the central axis C1 is referred to as an axial direction.

An opening portion on the vehicle body side of the cylinder 15 is closed by a rod guide 17 and the axle side of the rod 16 penetrates the rod guide 17. The rod guide 17 slidably supports the rod 16 and a rebound spring 18 which generates a reaction force when the tube 11 and the tube 12 are fully extended is arranged on the axle side of the rod guide 17.

The inside of the cylinder 15 is filled with oil (hydraulic oil) and a piston 19 provided for an enclosure member 42 attached to an axle side end of the rod 16 slides on an inner peripheral surface of the cylinder 15 when the tube 11 and the tube 12 expand or contract. The piston 19 divides the inner region of the cylinder 15 into a lower chamber 20 and an upper chamber 21.

As illustrated in FIG. 1, the rod 16 is a hollow shaft member including a flow path 22 (first flow path) for flowing oil in the axial direction. The rod 16 has an opening portion 23 (axle side opening portion) which opens at the axle side end and an opening portion 24 (vehicle body side opening portion) which opens at the vehicle body side end. In the embodiment, the opening portion 23 is located inside the upper chamber 21 in the cylinder 15. The upper chamber 21 is an oil chamber on the vehicle body side of the oil chambers partitioned by the piston 19 sliding inside the cylinder 15.

In the hydraulic shock absorber 1 including the enclosure member 42, which does not have the through-hole 42A described below, in both the compression stroke and the extension stroke, the oil flows from the upper chamber 21 into the flow path 22 and the oil flows inside the flow path 22 from the axle side toward the vehicle body side. The oil flowing out from the flow path 22 flows into a control unit 10 arranged on the vehicle body side of the rod 16.

A base valve 27 is arranged at the axle side end of the cylinder 15 and the control unit 10 is arranged on a cap member 25 arranged on the vehicle body side of the tube 11. The control unit 10 is a damping force generating unit which adjusts the damping force by adjusting the flow resistance of the oil flowing out from the opening portion 24 of the rod 16.

Figure 3:
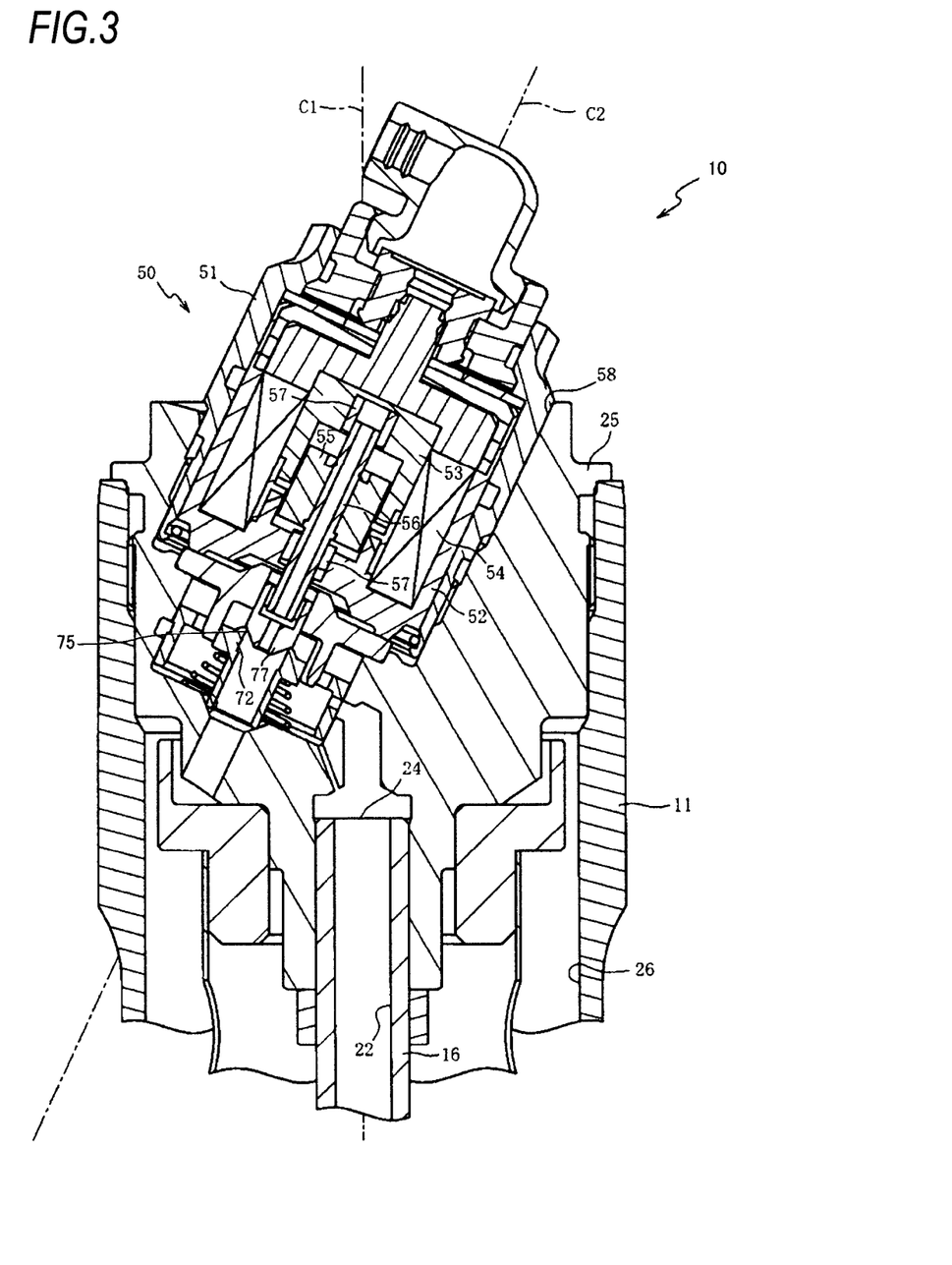
FIG. 3 is a diagram illustrating an example of a configuration of a control unit included in the hydraulic shock absorber.

FIG. 3 is a diagram illustrating an example of the configuration of the control unit 10. As illustrated in FIG. 3, the control unit 10 includes a drive unit 50 driven by an input of electric power from the outside, a valve rod 56 which moves forward or backward by driving the drive unit 50, and a valve body 77 (control valve) which moves by moving the valve rod 56 forward and backward.

The drive unit 50 is a drive mechanism which uses magnetic force to generate a driving force and includes two bottomed tubular cores 52 and 53 accommodated inside a cylindrical case 51, a coil 54 arranged between the cores 52 and 53, a yoke 55 arranged inside the core 53 and the coil 54, and a valve rod 56 supported by the yoke 55. A bush 57 is provided around the valve rod 56 and movably supports the valve rod 56. Since the core 53 is a fixed iron core and the yoke 55 is a movable iron core, when the coil 54 is energized and a magnetic field is generated, an axial operating force along a central axis C2 of the valve rod 56 is applied to the yoke 55. The case 51 is accommodated in a hole portion 58 formed in the cap member 25.

The control unit 10 electronically controls the area (opening area) of the gap between the valve body 77, which is a variable throttle valve, and a cutoff surface 75 of a valve seat 72, by advancing or retreating the valve rod 56 by the drive unit 50. Thereby, the magnitude of the damping force generated when the oil passes through the gap is controlled.

The control unit 10 is not limited to the configuration described above and a known damping force adjusting device may be used as the control unit 10. For example, the control unit 10 may include an electric motor driven by an input of electric power from the outside, a plunger which advances or retreats by driving the electric motor, and a control valve which opens or closes by the advance or retreat of the plunger.

As will be described below, impurities are removed from the oil flowing into the flow path 22 in an oil chamber 46 formed inside the enclosure member 42 and the oil from which the impurities have been removed flows into the control unit 10 from the flow path 22. Therefore, the inflow of impurities into the control unit 10 can be prevented.

The control unit 10 provided in the hydraulic shock absorber 1 does not need to be an electronically controlled damping force adjusting device and a damping force adjusting device for manually adjusting the damping force may be provided in the hydraulic shock absorber 1. However, since the electronically controlled damping force adjusting device is more susceptible to impurities, the invention is particularly meaningful when applied to a hydraulic shock absorber provided with the electronically controlled damping force adjusting device. The impurities which can be contained in the oil may include metal powder which is a magnetic substance. When metal powder, which is a magnetic material, flows into the drive unit 50 which generates a driving force by using magnetic force, the operability of the drive unit 50 may be lowered. By reducing the amount of metal powder, which is a magnetic material, that flows into the drive unit 50, such a decrease in operability can be prevented. Therefore, the invention is likely to be effective when applied to a hydraulic shock absorber including a drive unit which uses magnetic force to generate a driving force.

As illustrated in FIG. 1, the vehicle body side opening of the tube 11 is closed by the cap member 25 and the axle side opening of the tube 12 is closed by the wheel side bracket 13. The tubular gap formed in the overlapping portion of the tube 11 and the tube 12 is closed with an oil seal or the like so that the gas or oil sealed inside the tube 11 and the tube 12 does not leak out.

The hydraulic shock absorber 1 stores oil in a space outside the cylinder 15 surrounded by the tubes 11 and 12 and an air chamber is formed on the vehicle body side from the liquid level (not illustrated) of the stored oil. The space functions as a reservoir 26.

Figure 4:
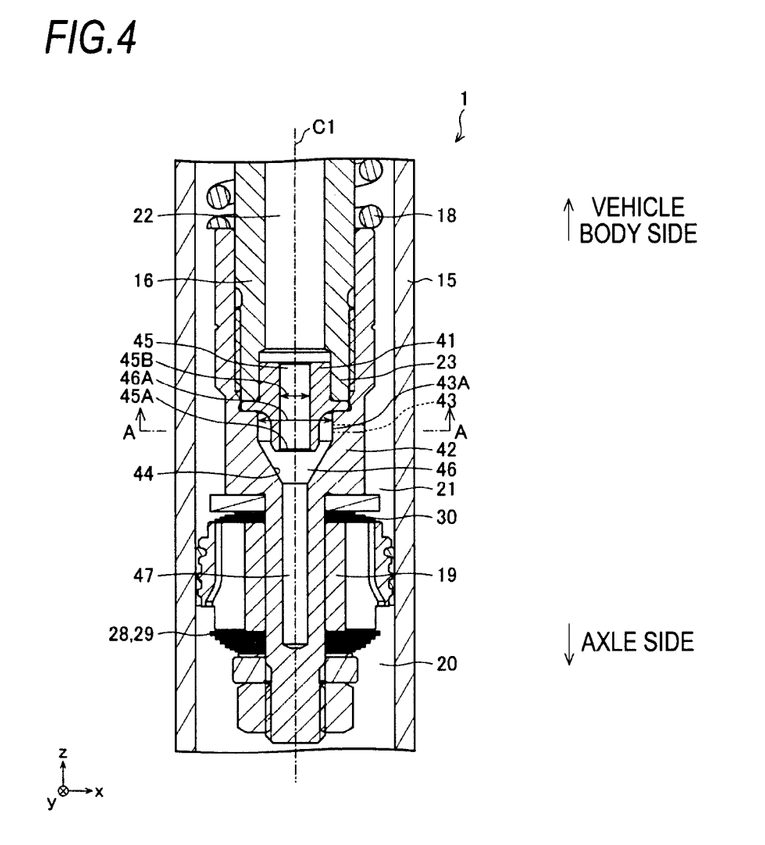
FIG. 4 is an enlarged view of the axle side end of the rod.

FIG. 4 is an enlarged view of the axle side end of the rod 16. As illustrated in FIG. 4, a hollow tip member 41 having an inner diameter smaller than that of the flow path 22 and including a flow path 45 (second flow path) connected to the flow path 22 inside is provided in the opening portion 23 which is the lower end opening of the flow path 22. In other words, at the axle side end of the rod 16, the tip member 41 forming an opening having an area smaller than the opening area of the opening portion 23 is arranged. The tip member 41 includes a flow path 45 which communicates with the flow path 22 inside the rod 16. The flow path 45 is an axle side flow path of the rod 16 which opens toward the oil chamber 46. As illustrated in FIG. 4, the hydraulic shock absorber 1 includes the enclosure member 42 arranged to surround at least the lower end of the rod 16.

Figure 5:
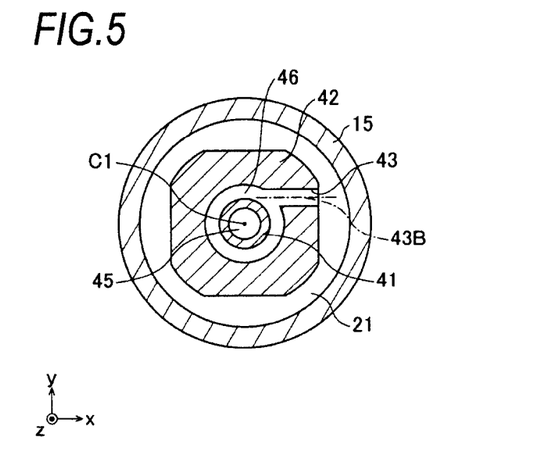
FIG. 5 is a cross-sectional view taken along the line A-A in FIG. 4.
Figure 6:
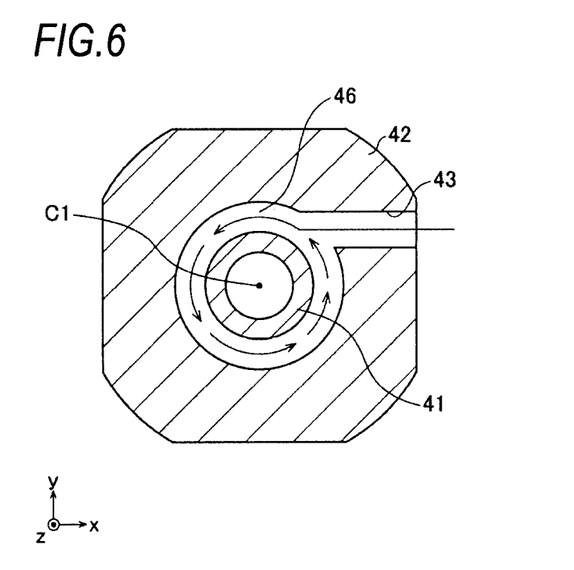
FIG. 6 is an enlarged view of a central portion of FIG. 5.

FIG. 5 is a cross-sectional view taken along the line A-A in FIG. 4. FIG. 6 is an enlarged view of the central portion of FIG. 5. As illustrated in FIGS. 5 and 6, the enclosure member 42 forms the oil chamber 46 communicating with the flow path 22 and the flow path 45 inside the enclosure member 42. The oil chamber 46 is an oil chamber for applying the centrifugal force to the inflowing oil and includes an arc in the cross section when the oil chamber 46 is cut in a plane perpendicular to the axial direction of the hydraulic shock absorber 1. That is, the oil chamber 46 has a cylindrical or conical inner wall surface.

The enclosure member 42 includes an inflow path 43 which guides oil from the upper chamber 21 to the oil chamber 46 (that is, from the outside to the inside of the enclosure member 42). The inflow path 43 is provided in a part of the enclosure member 42 so that (so that an axis 43B and the central axis C1 do not intersect) the axis 43B (see FIG. 5) of the inflow path 43 deviates from the central axis C1 (axis) of the rod 16. In other words, the inflow path 43 is formed so that the flow of oil flowing from the inflow path 43 into the oil chamber 46 does not intersect with the central axis C1. In other words, in the cross section when the oil chamber 46 is cut in a plane perpendicular to the axial direction of the hydraulic shock absorber 1, the flow of oil flowing from the inflow path 43 into the oil chamber 46 is eccentric from the center of the oil chamber 46. In the embodiment, the central axis of the oil chamber 46 is the same as the central axis C1 of the rod 16. The central axis of the oil chamber 46 is the axis parallel to the axial direction of hydraulic shock absorber 1. The central axis of the oil chamber 46 is an axis which passes through the center of the opening portion, which is a portion surrounded by the inner wall surface of the oil chamber 46 when the enclosure member 42 is cut in a plane perpendicular to the axial direction. In the example illustrated in FIG. 6, the inflow path 43 is formed perpendicular to the central axis C1, but the inflow path 43 may be formed so that the exit side is inclined toward the axle side.

Figure 7:
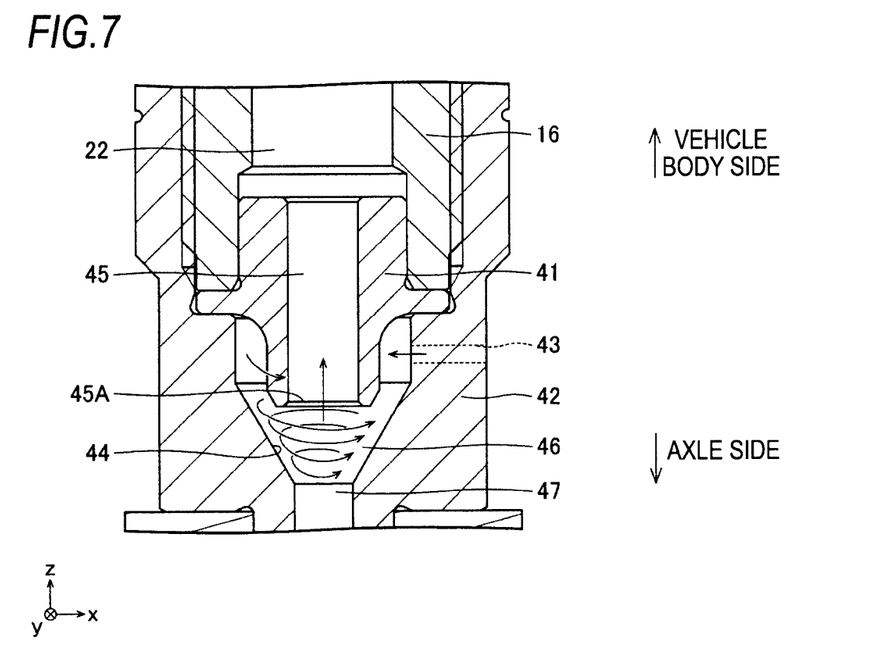
FIG. 7 is a diagram for explaining the flow of oil in an oil chamber formed in a vicinity of the axle side end of the rod.

FIG. 7 is a diagram for explaining the flow of oil in the oil chamber 46. Since the inflow path 43 is formed so that the axis of the inflow path 43 deviates from the central axis C1, as illustrated in FIG. 7, the oil flowing into the oil chamber 46 from the inflow path 43 moves to the axle side while swirling. From the viewpoint of swirling, it is preferable that the flow of oil flowing out from the inflow path 43 coincides with the tangent line to the outer edge of the oil chamber 46 illustrated in FIG. 7.

The enclosure member 42 includes the oil chamber 46 including a tapered portion 44 whose inner diameter decreases toward the downstream side, at least on the downstream side of the inflow path 43. In particular, the oil chamber 46 includes the tapered portion 44 in which the inner diameter of the oil chamber 46 decreases from the vehicle body side toward the axle side, which appears in the cross section when the oil chamber 46 is cut in a plane perpendicular to the axial direction of the hydraulic shock absorber 1. Therefore, the speed at which the oil swirls increases toward the axle side, and as a result, the generated centrifugal force also increases.

Due to the phenomenon, impurities contained in the oil move in the direction (on the inner wall surface side of the oil chamber 46) away from the central axis C1 due to the centrifugal force and oil with less impurities becomes present in the vicinity of the central axis C1.

On the other hand, as illustrated in FIG. 4, a diameter 45B of the opening portion 45A of the tip member 41 is smaller than a diameter 46A of the upper end opening portion of the oil chamber 46 which appears when the vehicle body side of the oil chamber 46 is cut in a plane perpendicular to the central axis C1. More specifically, in the cross section when the enclosure member 42 is cut in a plane perpendicular to the central axis C1 at the position where the inflow path 43 is formed, the diameter 45B of the flow path 45 is smaller than the diameter 46A of the oil chamber 46. Therefore, oil with few impurities located near the central axis C1 can be supplied to the flow path 22 via the flow path 45.

The opening portion 45A, which is the lower end of the tip member 41, is located below (axle side) the inflow path 43. Specifically, the opening portion 43A of the inflow path 43 which opens to the oil chamber 46 is located closer to the vehicle body side than the opening portion 45A of the flow path 45. Therefore, it is possible to prevent the oil flowing from the inflow path 43 into the oil chamber 46 directly (that is, in a state where impurities are not removed) flowing into the flow path 45.

The same effect as when the tip member 41 is provided may be obtained by forming the axle side end portion of the rod 16 itself into a tapered shape without providing the tip member 41. However, it is easier to manufacture the hydraulic shock absorber 1 when the tip member 41 is provided.

The oil chamber 46 includes an oil chamber 47 (recess portion) on the axle side of the tapered portion 44. The oil chamber 47 is a cylindrical oil chamber which accumulates impurities centrifuged in the tapered portion 44. The axle side of the oil chamber 47 is closed.

Figure 8:
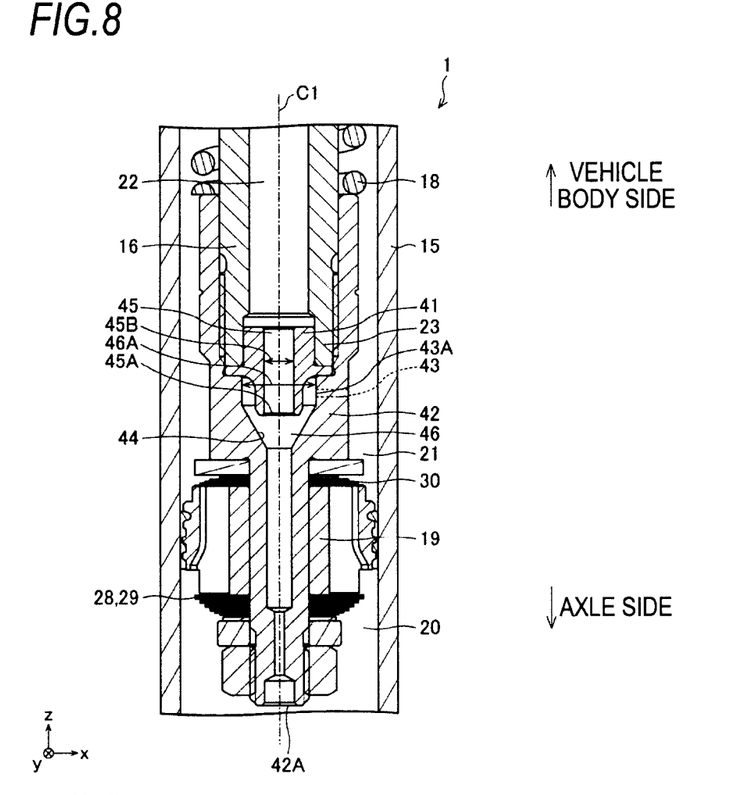
FIG. 8 is a diagram illustrating a modification example of an enclosure member provided at the axle side end of the rod.

Here, the oil chamber 47 in which the axle side is closed is provided on the lower side (axle side) of the oil chamber 46, but the hydraulic shock absorber 1 is not limited to this form. FIG. 8 is a diagram illustrating a modification example of the enclosure member 42. As illustrated in FIG. 8, the hydraulic shock absorber 1 may have a through-hole 42A connecting the oil chamber 46 and the lower chamber 20 on the lower side (axle side) of the oil chamber 46 instead of the oil chamber 47. The through-hole 42A is a through-hole (through path) formed inside the enclosure member 42, which communicates the oil chamber 46 and the lower chamber 20 and opens at the axle-side end of the enclosure member 42.

That is, the enclosure member 42 may include the oil chamber 47 as a recess portion arranged inside the lower end side (axle side) thereof, or the through-hole 42A penetrating the lower end side thereof.

By providing the enclosure member 42 with the oil chamber 47 whose axle side is closed (not open), it becomes possible to retain the centrifuged impurities in the oil chamber 47. As a result, it becomes easier to reduce the amount of impurities flowing into the flow path 22. On the other hand, by providing the through-hole 42A instead of the oil chamber 47, the impurities centrifuged in the oil chamber 46 can be guided to the through-hole 42A and the oil from which the impurities have been removed can be guided to the flow path 22. Impurities led to the through-hole 42A reach the lower chamber 20. Impurities that reached the lower chamber 20 can flow into the oil chamber 46 through the inflow path 43. However, since the oil chamber 46 can centrifuge impurities, the amount of impurities flowing into the flow path 22 can be reduced even in such a form.

From the viewpoint of making it easy to reduce the amount of impurities flowing into the flow path 22, a form in which the oil chamber 47 having a closed axle side is provided is preferable to a form in which the enclosure member 42 has the through-hole 42A.

In the compression process, oil flows from the upper chamber 21 to the flow path 22, and when the enclosure member 42 is in the form illustrated in FIG. 8, oil further flows from the lower chamber 20 to the flow path 22 through the through-hole 42A and a recess portion 47. On the other hand, in the extension stroke, oil flows from the upper chamber 21 to the flow path 22. The oil that flowed into the flow path 22 as such flows inside the flow path 22 from the axle side toward the vehicle body side. That is, even in the form in which the enclosure member 42 has the through-hole 42A, the oil flows from the axle side to the vehicle body side inside the flow path 22 in both the compression stroke and the expansion stroke.

SUMMARY

As described above, the hydraulic shock absorber 1 includes the tube 11 on the vehicle body side, the tube 12 on the axle side which moves with respect to the tube 11, the hollow rod 16 with the flow path 22 inside to allow oil to flow in the axial direction, the control unit 10 which is a damping force adjusting unit that adjusts the damping force by adjusting the flow resistance of oil, and the enclosure member 42 arranged to surround at least the lower end of the rod 16. The enclosure member 42 includes the inflow path 43 which guides oil from the outside to the inside and the inflow path 43 is arranged so that the axis of the inflow path 43 deviates from the central axis C1 which is the axis of the rod 16.

Therefore, the oil that flowed into the inside of the enclosure member 42 from the inflow path 43 moves to the axle side while swirling in the space (the space inside the oil chamber 46) provided inside. Here, the impurities contained in the oil move in the direction away from the central axis C1 due to the centrifugal force and the oil having few impurities becomes present in the vicinity of the central axis C1. It is possible to reduce the amount of impurities which flow with the oil.

At a portion located further on the downstream side than the inflow path 43, the enclosure member 42 includes at least the tapered portion 44 whose inner diameter becomes smaller toward the downstream side. Therefore, the speed at which the oil swirls can be increased toward the axle side and a larger centrifugal force can be generated. Therefore, it is possible to increase the separation efficiency of separating impurities from oil by the centrifugal force.

The hollow tip member 41 having an inner diameter smaller than that of the flow path 22 and including the flow path 45 connected to the flow path 22 inside is provided at the lower end opening of the flow path 22. Therefore, it is possible to selectively supply the oil having less impurities in the vicinity of the central axis C1 to the flow path 22. In other words, impurities can be less likely to be sucked into the flow path 22.

The opening portion 45A, which is the lower end of the tip member 41, is located below the inflow path 43. Therefore, the oil which flowed into the oil chamber 46 does not directly flow into the flow path 22 of the rod 16 and impurities are separated in the oil chamber 46, and then oil with less impurities is sucked up to the flow path 22 of the rod 16 via the opening portion 45A. Therefore, it is possible to make it difficult for impurities to be sucked into the flow path 22.

The enclosure member 42 may have the oil chamber 47 as a recess portion arranged inside the lower end side thereof, or a through-hole 42A penetrating the lower end side thereof. By forming the recess portion, the state in which impurities are separated can be maintained. Even when the through-hole 42A is provided, the oil from which impurities are removed can be flowed into the flow path 22 by using the centrifugal force.

The oil flowing out from the flow path 22 flows into the control unit 10. As a result, the oil from which impurities are removed can flow into the control unit 10, so that the damping force adjusting function can be easily maintained for a long period of time.

The control unit 10 which is a damping force adjusting unit includes the drive unit 50 which generates a driving force by using a magnetic force and the valve body 77 which opens or closes by driving the drive unit 50.

Impurities removed by the centrifugal force may include metal pieces. A metal piece which is a magnetic material is easily attracted to the drive unit 50 which utilizes magnetic force. When a metal piece gets into the drive unit 50, it becomes difficult to control the damping force to a target value for a long period of time. In the hydraulic shock absorber 1, impurities are removed from the oil flowing into the flow path 22 by passing through the oil chamber 46 formed inside the enclosure member 42 and the oil from which the impurities are removed flows into the control unit 10 from the flow path 22. Therefore, the inflow of impurities into the control unit 10 can be prevented, and as a result, the damping force adjusting function can be maintained for a long period of time.

Second Embodiment

Figure 9:
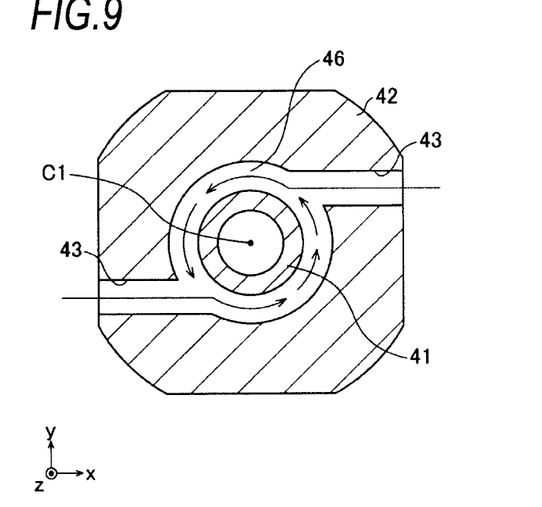
FIG. 9 is a cross-sectional view illustrating a modification example of the enclosure member.

FIG. 9 is a cross-sectional view illustrating a modification example of the enclosure member 42. As illustrated in FIG. 9, the enclosure member 42 may include a plurality of inflow paths 43. By appropriately setting the arrangement of the plurality of inflow paths 43, the oil vortex can be generated more efficiently. The number of inflow paths 43 formed may be determined in consideration of the balance with the damping force generated in the hydraulic shock absorber 1.

The invention is not limited to the embodiments described above and various modifications can be made within the scope of the claims. The technical scope of the invention also includes embodiments obtained by appropriately combining the technical means disclosed in the different embodiments.

Third Embodiment

Figure 10:
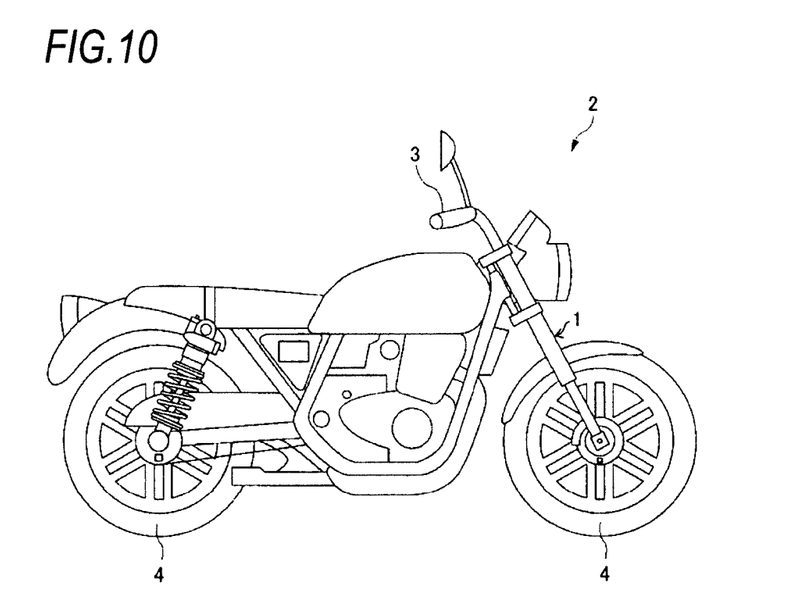
FIG. 10 is a side view illustrating a motorcycle equipped with the hydraulic shock absorber.
Figure 11:
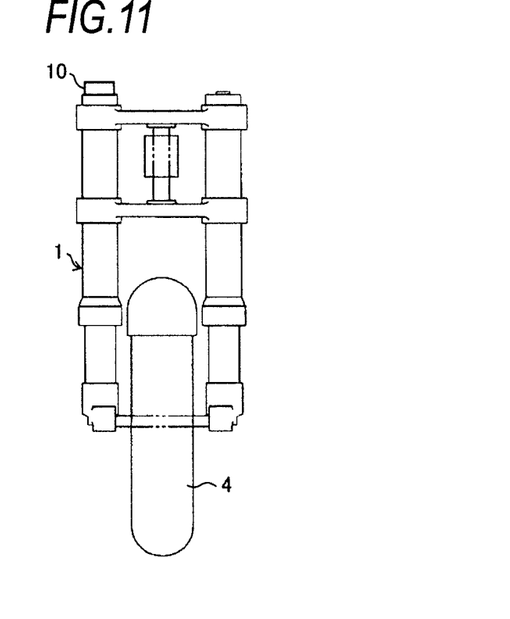
FIG. 11 is a front view illustrating a main part of the motorcycle.

Examples of the saddle-type vehicle equipped with the hydraulic shock absorber 1 include a motorcycle and a motor tricycle. The hydraulic shock absorber 1 is, for example, a front fork provided in a motorcycle. FIG. 10 is a side view illustrating a motorcycle 2 equipped with the hydraulic shock absorber 1. FIG. 11 is a front view illustrating a main part of the motorcycle 2.

As illustrated in FIGS. 10 and 11, the hydraulic shock absorber 1 is at least one of the two front forks provided in the motorcycle 2 including the wheel 4. The control unit 10 is located near a steering wheel 3 in the motorcycle 2. Various types of front forks provided in the motorcycle 2 can be adopted and both of the two front forks may be configured by the hydraulic shock absorbers 1.

Additional Notes

According to a first aspect, there is provided a hydraulic shock absorber (1) which includes a vehicle body side tube (11), an axle side tube (12) which moves with respect to the vehicle body side tube, a hollow rod (16) which is accommodated in the vehicle body side tube and includes a first flow path (22) in which oil flows in an axial direction inside, a damping force adjusting unit (10) which adjusts a damping force by adjusting a flow resistance of the oil, and an enclosure member (42) which is arranged to surround at least a lower end of the rod, where the enclosure member includes an inflow path (43) which guides oil from the outside to the inside and the inflow path is arranged so that an axis (43B) of the inflow path deviates from an axis (C1) of the rod.

In the first aspect, it is preferable that the enclosure member (42) includes a tapered portion (44) whose inner diameter decreases toward a downstream side, at least in a portion located further on the downstream side than the inflow path (43).

In the first aspect, it is preferable that a hollow tip member (41) having an inner diameter smaller than that of the first flow path (22) and including a second flow path (45) connected to the first flow path inside be provided in a lower end opening (23) of the first flow path.

In the first aspect including the hollow tip member (41), it is preferable that a lower end of the tip member (41) be located below the inflow path (43).

In the first aspect, it is preferable that the enclosure member (42) includes a recess portion (47) arranged inside a lower end side or a through-hole (42A) penetrating the lower end side.

In the first aspect, it is preferable that oil which is flowed out of the first flow path (22) flow into the damping force adjusting unit (10).

In a first aspect where the oil which is flowed out of the first flow path (22) flows into the damping force adjusting unit (10), the damping force adjusting unit (10) can include a drive unit (50) which generates a driving force by using magnetic force and a control valve (77) which opens or closes by driving the drive unit.

According to a second aspect, there is provided a saddle-type vehicle (2) including the hydraulic shock absorber (1) according to the first aspect.

REFERENCE SIGNS LIST

1 hydraulic shock absorber
2 motorcycle (saddle-type vehicle)
10 control unit (damping force adjusting unit)
11 tube (vehicle body side tube)
12 tube (axle side tube)
15 cylinder
16 rod (hollow rod)
19 piston
22 flow path (first flow path)
23 opening portion (lower end opening)
41 tip member
42 enclosure member
42A through-hole
43 inflow path
43B axis
44 tapered portion
45 flow path (second flow path)
45B diameter
46A diameter
46 oil chamber
47 oil chamber (recess portion)
50 drive unit
77 valve body (control valve)

What is claimed is:
1. A hydraulic shock absorber, comprising:
a vehicle body side tube;
an axle side tube which moves with respect to the vehicle body side tube;
a hollow rod which is accommodated in the vehicle body side tube and includes a first flow path in which oil flows in an axial direction inside;
a damping force adjusting unit which adjusts a damping force by adjusting a flow resistance of the oil;
a hollow tip member having an inner diameter smaller than that of the first flow path and including a second flow path connected to the first flow path, said hollow tip member being provided in a lower end opening of the first flow path;
an enclosure member which is arranged to surround at least a lower end of the rod, wherein
the enclosure member has an oil chamber for applying a centrifugal force to the oil, said oil chamber communicating with the first flow path and the second flow path inside the enclosure member,
the enclosure member includes an inflow path which guides oil from outside of the enclosure member to inside thereof,
the inflow path is arranged so that an axis of the inflow path deviates from an axis of the rod and a flow of oil flowing from the inflow path into the oil chamber is eccentric from the center of the oil chamber,
the inflow path extends so that the axis of the inflow path is perpendicular to the axis of the rod, and
the oil chamber has a cylindrical or conical inner wall surface and contains an arc in a cross section when cut in a plane perpendicular to the axis of the rod.

2. The hydraulic shock absorber according to claim 1, wherein
the enclosure member includes a tapered portion whose inner diameter decreases toward a downstream side, at least in a portion located further on the downstream side than the inflow path.

3. The hydraulic shock absorber according to claim 2, wherein
a lower end of the tip member is located below the inflow path.

4. The hydraulic shock absorber according to claim 2, wherein the enclosure member includes a recess portion arranged inside a lower end side or a through-hole penetrating the lower end side.

5. The hydraulic shock absorber according to claim 2, wherein
oil which is flowed out of the first flow path flows into the damping force adjusting unit.

6. The hydraulic shock absorber according to claim 5, wherein
the damping force adjusting unit includes a drive unit which generates a driving force by using magnetic force and a control valve which opens or closes by driving the drive unit.

7. A saddle-type vehicle, comprising:
the hydraulic shock absorber according to claim 2.

8. The hydraulic shock absorber according to claim 1, wherein
a lower end of the tip member is located below the inflow path.

9. The hydraulic shock absorber according to claim 8, wherein
the enclosure member includes a recess portion arranged inside a lower end side or a through-hole penetrating the lower end side.

10. The hydraulic shock absorber according to claim 8, wherein
oil which is flowed out of the first flow path flows into the damping force adjusting unit.

11. The hydraulic shock absorber according to claim 10, wherein
the damping force adjusting unit includes a drive unit which generates a driving force by using magnetic force and a control valve which opens or closes by driving the drive unit.

12. A saddle-type vehicle, comprising:
the hydraulic shock absorber according to claim 8.

13. The hydraulic shock absorber according to claim 1, wherein
the enclosure member includes a recess portion arranged inside a lower end side or a through-hole penetrating the lower end side.

14. The hydraulic shock absorber according to claim 13, wherein
oil which is flowed out of the first flow path flows into the damping force adjusting unit.

15. The hydraulic shock absorber according to claim 14, wherein
the damping force adjusting unit includes a drive unit which generates a driving force by using magnetic force and a control valve which opens or closes by driving the drive unit.

16. A saddle-type vehicle, comprising:
the hydraulic shock absorber according to claim 13.

17. The hydraulic shock absorber according to claim 1, wherein
oil which is flowed out of the first flow path flows into the damping force adjusting unit.

18. The hydraulic shock absorber according to claim 17, wherein
the damping force adjusting unit includes a drive unit which generates a driving force by using magnetic force and a control valve which opens or closes by driving the drive unit.

19. A saddle-type vehicle, comprising:
the hydraulic shock absorber according to claim 17.

20. A saddle-type vehicle, comprising:
the hydraulic shock absorber according to claim 1.

21. The hydraulic shock absorber according to claim 1, wherein
the enclosure member surrounds the tip member in the axial direction.

* * * * *